C. BRADY.
Hackling Machine.
No. 33,333. Patented Sept. 24, 1861.
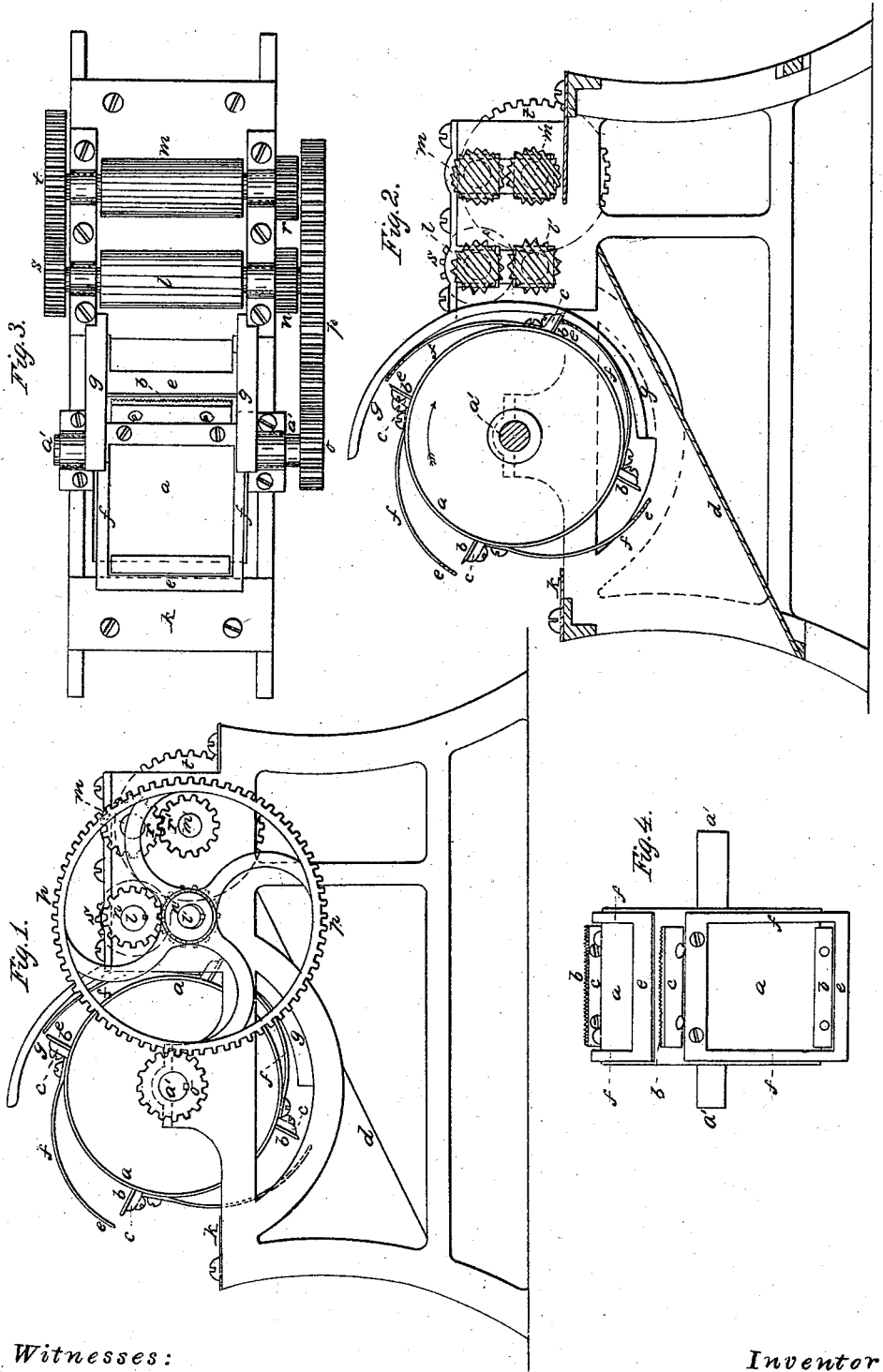
Witnesses:
Inventor:

UNITED STATES PATENT OFFICE.

CHARLES BRODY, OF NEW YORK, N. Y.

IMPROVEMENT IN MACHINERY FOR CLEANING VEGETABLE FIBERS.

Specification forming part of Letters Patent No. 33,333, dated September 24, 1861.

*To all whom it may concern:*

Be it known that I, CHARLES BRODY, of the city, county, and State of New York, have invented a new and useful machine for cleaning vegetable fibers and separating them from the surrounding fleshy and other matter; and I do hereby declare that the following is a full and exact description of the same, reference being had to the accompanying drawings, which make a part of the same.

I devised this machine particularly with reference to cleaning the fiber contained in the leaves of a certain plant which grows wild and in great abundance in Central America, and of which no important use has yet been made, but which, I believe, will become of more importance than any other plant for textile materials. This plant the natives of that country call "pita," and its leaves grow at great length and contain a longer and stronger fiber than any other plant or vegetable matter known to me, being often from three to four yards long and of great strength and smoothness.

The machine which I am now about to describe I have contrived especially for separating the fiber from the other matter of the leaf of said plant.

Of the drawings annexed, Figure 1 is a side elevation of the machine. Fig. 2 is a longitudinal cut section of the same. Fig. 3 is a plan or top view of the same, and Fig. 4 is a front view of the comb-cylinder with its fixtures.

I construct the machine as follows: The cylinder $a$ is attached to a shaft, $a'$, which runs in bearings upon a proper frame, and receives a rapid motion in the direction of the arrow in Fig. 2 by any convenient means. Upon the surface of this cylinder $a$, I secure by any convenient means a number of combs, $b$, which project radially from the surface of the cylinder. The combs, in their rapid rotary motion, dig into the leaf, which is presented to them gradually by certain feed-rollers, hereinafter to be described, and separate the fibers by scraping off the fleshy matter that surrounds them, and the fibers thus separated pass off on the inclined board $d$. The fleshy matter remaining on the combs is then removed by a scraper, $e$, supported by a spring, $f$, which is fastened to the surface of the cylinder. Each of the combs is provided with such scraper. These scrapers receive a vibrating motion while the cylinder $a$ revolves—that is, the scraper is being depressed when the comb is going to act upon the leaf, thereby exposing the teeth of the comb to take effect upon the leaf; and when the comb has done its work and passed from the leaf the scraper flies out by the action of the spring, and, being in close contact with the comb, will remove from the comb all matter adhering to it, and thus clean it. The means by which I obtain this motion of the scrapers are two stationary cams or guides, $g$, one on each side of the machine, permanently secured to the frame. The lower parts of these cams $g$ are concentric with the cylinder $a$; but the upper parts are eccentric, diverging from the periphery of the cylinder, so that when this cylinder $a$ turns in the direction of the arrow the ends of the scrapers $e$ successively come into contact with the cams $g$, and, traveling down on the eccentric part of the cams, are gradually depressed and brought below the teeth of the combs. The scrapers are then retained in this relative position to the combs by the concentric part of the cam $g$ until the combs arrive at their lowest point in the revolution, when they have done their work. There the cam $g$ terminates, and permits the scrapers to expand by means of the springs to which they are attached, thereby removing all stuff that may adhere to said combs, and thus clean them. The scrapers also require cleaning, and this is accomplished by a board or stationary scraper, $k$, attached to the frame, and made adjustable, so as to set its front edge close up to the teeth of the combs. The scrapers in their revolution come in contact with this board, which then scrapes off all matter adhering to them, and also assists in cleaning the teeth of the combs.

The feeding of the leaves or other material into the machine is done by two pairs of grooved rollers, $l\ l'$ and $m\ m'$. The rollers $l\ l'$ are geared together by two wheels of equal size, $n\ n'$, and are driven from the shaft $a'$ by a pinion-wheel, $o$, gearing into a large wheel, $p$, which is fastened upon the shaft of the lower roller, $l'$. The rollers $m\ m'$ are also geared together by wheels of equal size, $r\ r'$, and receive their motion from the shaft of the roller $l$ by a pinion-wheel, $s$, gearing into the larger wheel $t$ upon the shaft of the lower roller, $m'$. The latter pair of rollers $m\ m'$ receive the leaf or other material and feed it on. They compress the material somewhat without crushing it or breaking the fiber. After the material has left these rollers $m\ m'$ it enters the other rollers, $l\ l'$, which turn faster than the last-mentioned pair, $m\ m'$, and to some extent scrape off the fleshy matter, and thus partially clean the fibers, the sharp edges of the grooves acting somewhat as scrapers. After the material has left these rollers it is presented to the combs of the cylinder $a$, which finish the process of separating the fibers of the leaves from the fleshy matter.

Having described my invention, what I claim, and desire to secure by Letters Patent, is—

1. The combination of the combs and the scrapers supported by a spring or springs, for the purpose set forth.

2. The combination, with those scrapers and combs, of the cam $g$, to operate upon the scrapers and cause them to act substantially as specified.

3. The combination, with those combs and movable scrapers, of the cleaning-board or stationary scraper $k$, for the purpose of cleaning the movable scrapers.

4. Said two pairs of feeding-rollers, one pair running faster than the other, in combination with the combs and movable scraper, for the purpose and substantially as above specified.

CHARLES BRODY.

Witnesses:
MILES B. ANDRUS,
JAS. H. BULL.